March 4, 1969   H. D. PAHL, JR   3,431,427
SOLID STATE COLOR BALANCE CONTROLLER FOR INCANDESCENT LAMPS
Filed Oct. 24, 1965
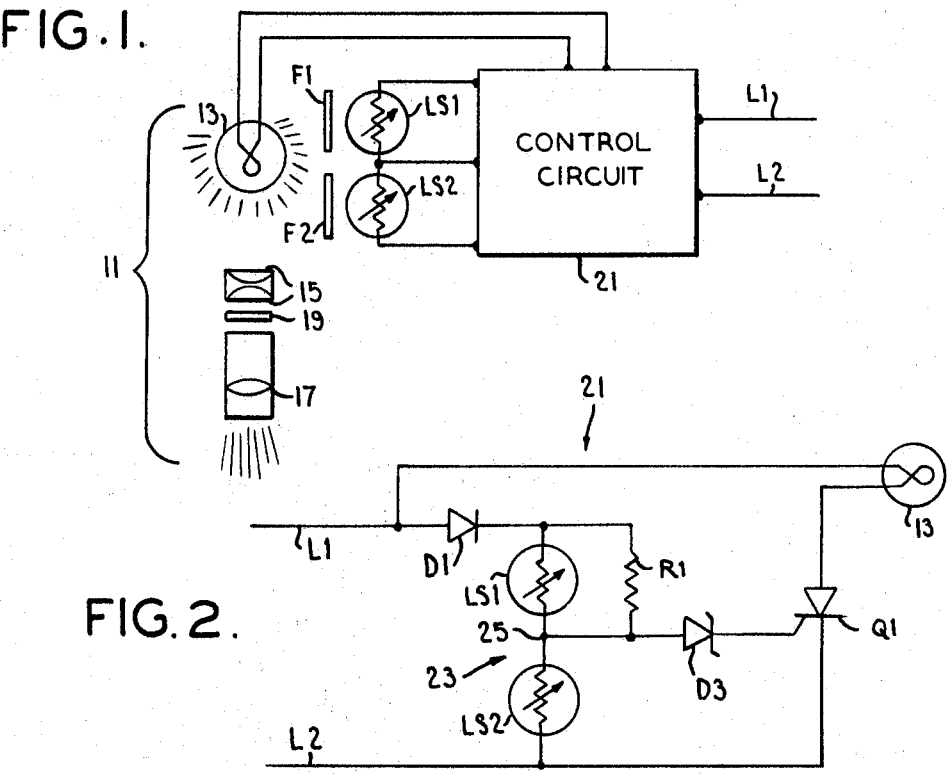
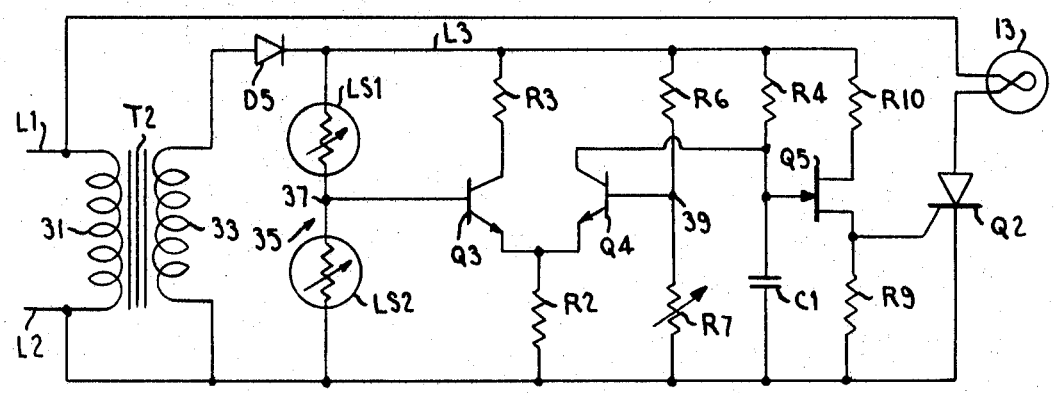
Henry D. Pahl, Jr.
Inventor.

3,431,427
SOLID STATE COLOR BALANCE CONTROLLER
FOR INCANDESCENT LAMPS
Henry D. Pahl, Jr., Webster Groves, Mo.,
(818 Olive St., St. Louis, Mo. 63101)
Filed Oct. 24, 1965, Ser. No. 504,466
U.S. Cl. 250—226     3 Claims
Int. Cl. H01j 39/12, 5/16

ABSTRACT OF THE DISCLOSURE

The apparatus described varies the phase angle of conduction through a triggerable semiconductor current switching device for varying the energization of an incandescent lamp to maintain a preselected color balance suitable for exposing color photographic materials such as films and paper.

---

This invention relates to color balance controllers and more particularly to a color balance controller for incandescent lamps used in photographic color printing.

In photographic color printing or enlarging, the color balance of the light used for exposing the photosensitive material is highly critical since the sensitive material will respond to changes in the color balance of the light used as well as to the differences in color which occur over different areas of the negative or transparency being printed. Heretofore, attempts have been made to obtain a constant color balance in incandescent projection lamps by applying a constant, regulated voltage to the lamp. However, this expedient typically does not produce the preferred color balance or even a preselected color balance because the equilibrium temperatures of different filaments are typically different even though the voltage applied to each is the same. Further, the efficiency and color balance of a given filament will change over its life so that, even without external effects, annoying shifts in color quality will occur.

Among the several objects of the invention may be noted the provision of apparatus for sensing and controlling color balance directly; the provision of such apparatus which modulates the power applied to an incandescent lamp to maintain its color temperature substantially equal to a preselected value; and the provision of such apparatus which is reliable and is relatively simple and inexpensive. Other objects and features will be in part apparent and in part pointed out hereinafter.

Briefly, apparatus according to this invention includes first and second photoelectric elements adapted to receive light from a lamp to be controlled, the second photoelectric element having a spectral response characteristic which differs substantially from that of the first photoelectric element. The apparatus also includes means responsive to the relative levels of response of the photoelectric elements to light emitted by said lamp for modulating the power applied to said lamp to maintain the ratio of said responses at a preselected value whereby a preselected color balance is maintained in the light emitted by said lamp.

The invention accordingly comprises the apparatus hereinafter described, the scope of the invention being indicated in the following claims.

In the accompanying drawings, in which several of various possible embodiments of the invention are illustrated, FIG. 1 illustrates a photographic color printing system including apparatus according to the invention for controlling the color balance of light emitted by a printing lamp;

FIG. 2 is a schematic circuit diagram of a color balance controller; and

FIG. 3 is a schematic circuit diagram of another embodiment of a color balance controller according to the invention.

Corresponding reference characters indicate corresponding parts throughout the several views of the drawings.

Referring now to FIG. 1, there is indicated at 11 a conventional photographic projection system comprising an incandescent lamp 13, a pair of condenser lenses 15 and a projection lens 17, these elements being supported by a conventional housing (not shown). A color transparency to be printed is indicated at 19.

A pair of photocells LS1 and LS2 are mounted so as to receive light from lamp 13 without passing through transparency 19. It should be understood that photocells LS1 and LS2 may also be mounted in a position remote from the projection system with light from lamp 13 being brought to the photocells by means of a fiberoptic light pipe. In the example illustrated, photocells LS1 and LS2 are constituted by photosensitive resistors employing a photoresponsive semiconductor material such as cadmium sulfide. Photocell LS1 is provided with a red filter F1 and photocell LS2 is provided with a blue filter F2 so that the two photocells effectivey have different spectral response characteristics. Photocells LS1 and LS2 are connected to a control circuit, indicated generally at 21 in FIG. 1, which modulates the power applied to lamp 13. Power for this purpose is obtained, through a pair of leads L1 and L2, from a suitable power source or supply mains (not shown).

The control circuit 21 is illustrated in detail in FIG. 2 together with its interconnection with the printing system components shown in FIG. 1. Photocells LS1 and LS2 are connected in series to constitute a voltage divider 23. Photocells LS1 and LS2 meet at a junction 25. The voltage divider 23 is connected across lines L1 and L2 by a circuit which includes a diode D1. Diode D1 isolates the voltage divider from line L1 when line L1 is negative with respect to line L2. A resistor R1 shunts photocell LS1 for establishing a maximum value of resistance which can appear in the upper portion of voltage divider 23.

Lamp 13 is connected across lines L1 and L2 by a circuit which includes the anode-cathode circuit of an SCR (silicon controlled rectifier) Q1. The gate terminal of SCR Q1 is conected to junction 25 by a four-layer breakdown diode D3. Under appropriate circumstances, other voltage breakdown devices, such as a neon tube, may be used in place of diode D3.

The operation of this circuit is as follows, only those half cycles when line L1 is positive with respect to line L2 being considered. As the amount of light falling on either of photocells LS1 and LS2 increases, its resistance decreases. Since photocell LS1 receives substantially only the red component of the light from lamp 13 and photocell LS2 receives substantially only the blue component of that light, it can be seen that the voltage at junction 25 depends upon and is a function of the color balance of the light emitted from the lamp. When the voltage at junction 25 exceeds the threshold established by the breakover voltage of diode D3, current is applied to the gate of SCR Q1 triggering it into conduction and energizing lamp 13. Resistor R1 assures that SCR Q1 will be triggered at low light levels when both photocells exhibit a high resistance so that lamp 13 will not fail to start.

As will be understood by those skilled in the art, triggering will occur early in each A.C. half cycle when the red light component is large relative to the blue light component. Thus, a relative large value of average power is applied to lamp 13.

As the power applied to lamp 13 increases, the temperature of its filament and the color temperature of the light emitted increase correspondingly so that the color balance shifts towards the blue. The resultant decrease in the resistance of photocell LS2 reduces the voltage at junction 25 and, by delaying the time of triggering SCR Q1, also reduces the power passed to lamp 13. It can thus be seen that a correcting or servo control is exercised over the color balance of lamp 13, which control tends to maintain the color balance at a preselected value.

It should be noted that, due to the connection of photocells LS1 and LS2 as a voltage divider, the voltage appearing at terminal 25 is essentially sensitive only to the relative intensities of the red and blue components of the light from lamp 13 and that this voltage is relatively independent of the intensity of that light. Accordingly, the apparatus according to the invention tends to maintain the preselected color balance independently of the size or characteristics of the filament of lamp 13 or its age.

In FIG. 3 there is illustrated another embodiment of the control apparatus according to the invention, which embodiment possesses a higher loop gain and can therefore exercise a tighter servo control over the color balance of the light emitted from lamp 13. Lamp 13 is again connected across lines L1 and L2 by a circuit which includes the anode-cathode circuit of an SCR Q2. The primary winding 31 of a stepdown transformer T2 is also connected across lines L1 and L2. Transformer T2 includes a secondary winding 33 one end of which is connected to line L2 and the other end of which supplies current at a reduced voltage through a line L3 to the semiconductor control circuitry described in greater detail hereinafter. A diode D5 isolates the control circuitry from secondary winding 33 on those half cycles when line L1 is negative with respect to line L2. Photocells LS1 and LS2 are again connected in series to constitute a voltage divider 35, there being a junction 37 between the photocells. Voltage divider 35 is connected between lines L3 and L2 to be energized from secondary winding 33.

A pair of NPN transistors Q3 and Q4 are interconnected in a circuit constituting a differential amplifier. The collector terminals of transistors Q3 and Q4 are provided with respective load resistors R3 and R4. The emitter terminals of transistors Q3 and Q4 are commonly connected to line L2 by a resistor R2 which provides coupling between the two transistors. The base terminal of transistor Q3, which constitutes one of the inputs to the differential amplifier, is connected to voltage divider 35 at junction 37. The base terminal of transistor Q4, which constitutes the other input to the differential amplifier, is connected to a junction 39 between a pair of serially connected resistors R6 and R7. Resistor R7 is variable. Resistors R6 and R7 are connected as a voltage divider across lines L3 and L2 so as to provide an adjustable reference voltage at junction 39, which reference voltage is a preselected portion of the total voltage appearing between those lines.

The collector terminal of transistor Q4 is also connected to the emitter terminal of a unijunction transistor Q5 which is interconnected in a circuit for triggering SCR Q2. Th ebase-one and base-two terminals of unijunction transistor Q5 are provided with respective load or current limiting resistors R9 and R10 respectively and the base-one terminal is also connected to the gate terminal of SCR Q2. A timing capacitor C1 is connected between the emitter of the unijunction transistor and line L2. As will be understood by those skilled in the art, this circuit will deliver a triggering pulse to the gate of SCR Q2 when the capacitor C1 charges to the peak point voltage which is determined by the characteristics of unijunction transistor Q5.

The operation of this circuit is as follows, again only those half cycles when line L1 is positive with respect to line L2 being considered. On each such A.C. half cycle, capacitor C1 will be charged by current flowing through R4 until unijunction transistor Q5 fires to trigger SCR Q2. However, the amount of current which is available for charging capacitor C1 depends upon the conduction or lack thereof in transistor Q4.

When the light from lamp 13 is predominantly red, the resistance of photocell LS1 will be low relative to that of photocell LS2 and the voltage at junction 37 will be greater than the reference voltage at the junction 39. Accordingly, transistor Q3 will conduct more heavily than transistor Q4. When conduction in transistor Q4 is thus reduced or cut off, more current is available through resistor R4 for charging capacitor C1. Capacitor C1 will thus reach the triggering voltage of transistor Q5 at an early point in the A.C. half cycle and a relatively large average power will be transmitted by SCR Q2 to lamp 13. If, however, the filament of lamp 13 heats to a temperature such that the blue component predominates in its light output, the resistance of photocell LS2 will drop and the voltage at junction 37 will be reduced correspondingly. When the voltage at junction 37 falls below the reference voltage at junction 39, the balance in the differential amplifier will shift and transistor Q4 will conduct more heavily than transistor Q3. Conduction in transistor Q4 shunts current from resistor R4 away from capacitor C1 so that the voltage on capacitor C1 will trigger unijunction transistor Q5 late in the A.C. half cycle, if at all. Accordingly, the power transmitted by SCR Q2 to lamp 13 will be reduced. It can thus be seen that this apparatus constitutes a servo loop for maintaining the color balance of light emitted from lamp 13 at a preselected value which is determined by the adjustable reference voltage at the junction 39. Since the differential amplifier constituted by transistors Q3 and Q4 provides a relatively high gain, a tight servo control of color balance is provided. It will be apparent to those skilled in the art that other conventional types of variable phase angle firing controls may also be used to trigger SCR Q2 in response to the voltage provided by divider 35.

While filters have been shown as means for obtaining different spectral responses in the two photocells, it should be understood that different spectral responses may be obtained by using photocells of different types or materials and which therefore have inherently different spectral responses. Similarly, while red and blue have been described as the particular colors which vary representatively with shifts in color balance, it should be understood that other colors or mixtures of colors may be used or that a single color may be compared with white to obtain a signal which is representative of color balance and relatively independent of light intensity. It should also be understood that other circuits will be apparent to those skilled in the art for responding to the relative level of output from the two photoelectric elements or for providing a threshold level above which the lamp is energized.

In view of the above, it will be seen that the several objects of the invention are achieved and other advantageous results attained.

As various changes could be made in the above apparatus without departing from the scope of the invention, it is intended that all matter contained in the above description or shown in the accompanying drawings shall be interpreted as illustrative and not in a limiting sense.

What is claimed is:
1. Apparatus for controlling the color balance of light emitted from an incandescent lamp which is employed for exposing photographic materials, said apparatus comprising:
   a triggerable semiconductor current switching device;
   circuit means for connecting said device and said lamp in series across an A.C. power source;
   a first photoelectric element;
   a second photoelectric element having a spectral response characteristic which differs substantially from that of said first photoelectric element, both of said elements being adapted to receive light from said lamp;

means for connecting said elements in series to constitute a voltage divider the output voltage of which varies as a function of the color balance of the light impinging upon said elements and is relatively insensitive to the intensity of the light;

a capacitor;

means for charging said capacitor at a rate which varies as a function of said voltage; and means for triggering said semiconductor device when the voltage on said capacitor reaches a predetermined level whereby the phase angle of conduction of said device varies as a function of the color balance of the light emitted from said lamp thereby to maintain a preselected color balance.

2. Apparatus as set forth in claim 1 wherein said means for triggering said semiconductor device comprises a unijunction transistor.

3. Apparatus as set forth in claim 2 wherein said means for charging said capacitor includes means for providing a reference voltage and a differential amplifier responsive to the difference between said divider output voltage and said reference voltage.

References Cited

UNITED STATES PATENTS

| | | | |
|---|---|---|---|
| 2,433,624 | 12/1947 | Rabinowitz | 315—151 |
| 2,749,501 | 6/1956 | Bartlett | 250—226 |
| 3,031,578 | 4/1962 | Colburn | 250—205 |
| 3,040,241 | 6/1962 | Wunderman | 250—205 |
| 3,348,131 | 10/1967 | Banks | 323—21 |

JAMES W. LAWRENCE, *Primary Examiner.*

DAVID O'REILLY, *Assistant Examiner.*

U.S. Cl. X.R.

315—151; 250—205, 217, 220; 323—21